(12) United States Patent  
Watts

(10) Patent No.: US 8,487,753 B1
(45) Date of Patent: Jul. 16, 2013

(54) ANTI-THEFT SYSTEM FOR VEHICLES

(76) Inventor: Otis Watts, Cleveland Heights, OH (US)

( * ) Notice: Subject to any disclaimer, the term of this patent is extended or adjusted under 35 U.S.C. 154(b) by 537 days.

(21) Appl. No.: 12/792,541

(22) Filed: Jun. 2, 2010

(51) Int. Cl.
B60R 25/10 (2006.01)

(52) U.S. Cl.
USPC .................. 340/426.35; 455/411

(58) Field of Classification Search
USPC .............. 455/411; 307/10.2; 340/426.35, 340/5.2, 5.72, 543, 825.31
See application file for complete search history.

(56) References Cited

U.S. PATENT DOCUMENTS

| 4,852,680 A | 8/1989 | Brown et al. |
| 5,006,843 A | 4/1991 | Hauer |
| 5,023,591 A | 6/1991 | Edwards |
| 5,045,837 A | 9/1991 | Gosker |
| 5,422,632 A | 6/1995 | Bucholtz et al. |
| 5,473,200 A * | 12/1995 | Woo .............................. 307/10.2 |
| 5,559,493 A | 9/1996 | Karnwie-Tuah |
| 5,602,426 A | 2/1997 | Ecker |
| 5,793,122 A | 8/1998 | Dingwall et al. |
| 5,821,631 A | 10/1998 | Loraas et al. |
| D434,425 S | 11/2000 | Rossow et al. |
| 6,606,492 B1 * | 8/2003 | Losey ........................... 455/411 |

* cited by examiner

Primary Examiner — Hai Phan
Assistant Examiner — Kaleria Knox

(57) ABSTRACT

An anti-theft system for a vehicle featuring a first keypad device for controlling an ignition system, and a second keypad device for controlling a door lock system, the keypad devices each comprise a pre-programmed personal identification number (PIN), wherein the first keypad device functions to operatively connect the ignition system to the power system when the correct first PIN is entered and the second keypad device functions to operatively connect the door lock system to the power system when the correct second PIN is entered.

3 Claims, 4 Drawing Sheets

ANTI-THEFT SYSTEM FOR VEHICLES

FIELD OF THE INVENTION

The present invention is directed to systems for preventing theft of vehicles, more particularly to personal identification number-based locking systems for preventing vehicle theft.

BACKGROUND OF THE INVENTION

Vehicle theft is unfortunately an extremely common problem. The present invention features an anti-theft system for vehicles. The system of the present invention comprises a first keypad device for locking and unlocking the ignition of the vehicle and a second keypad device for locking and unlocking the doors of the vehicle. A user can program his/her code (personal identification number, PIN) such that his/her code will lock and unlock the ignition and doors.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
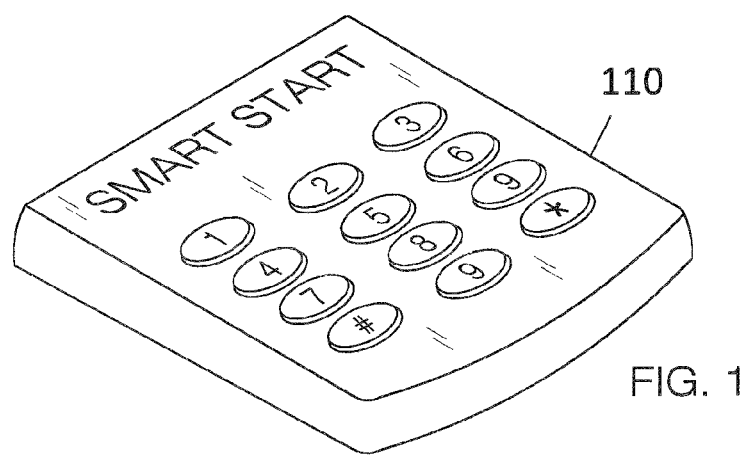
FIG. 1 is a perspective view of the first keypad device of the system of the present invention.
Figure 2:
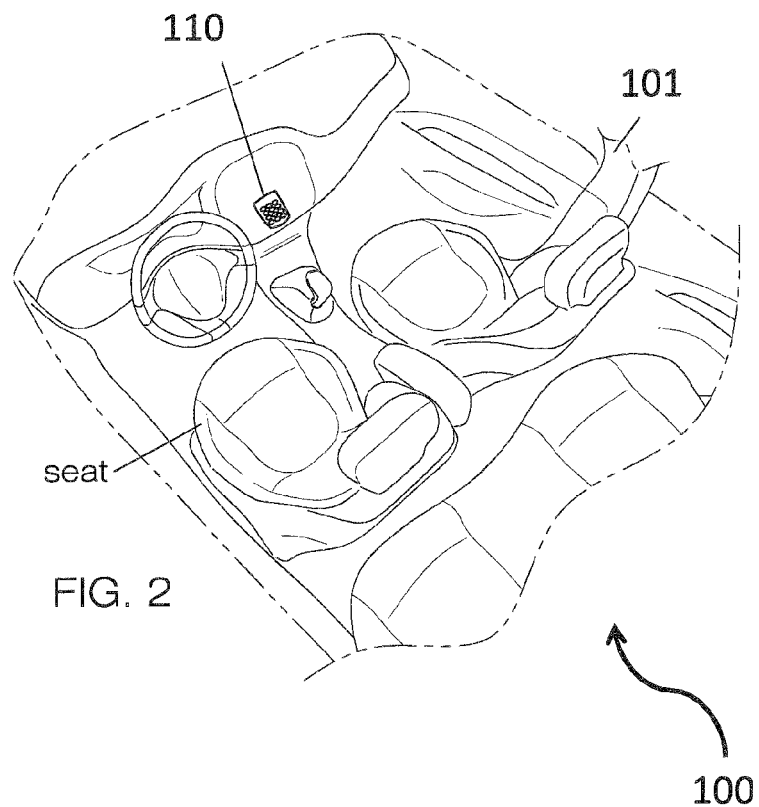
FIG. 2 is an in-use view of the first keypad device of FIG. 1.
Figure 3:
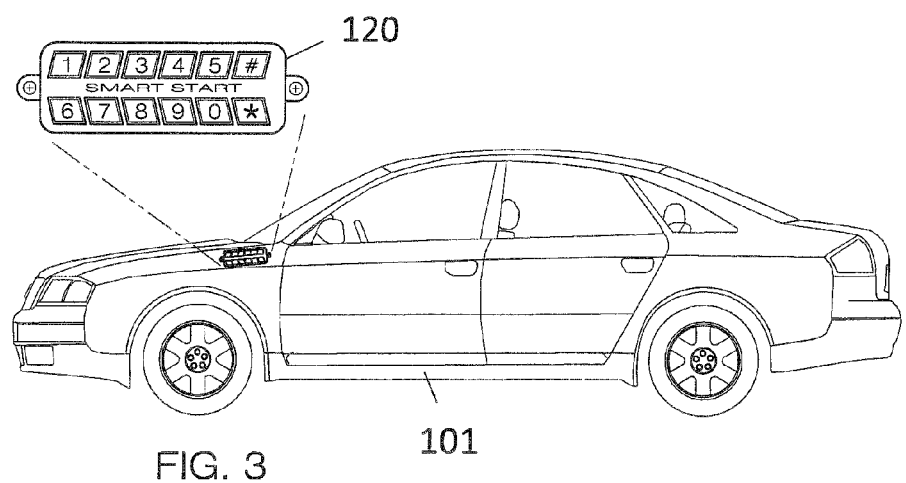
FIG. 3 is a side view of the system of the present invention.
Figure 4:
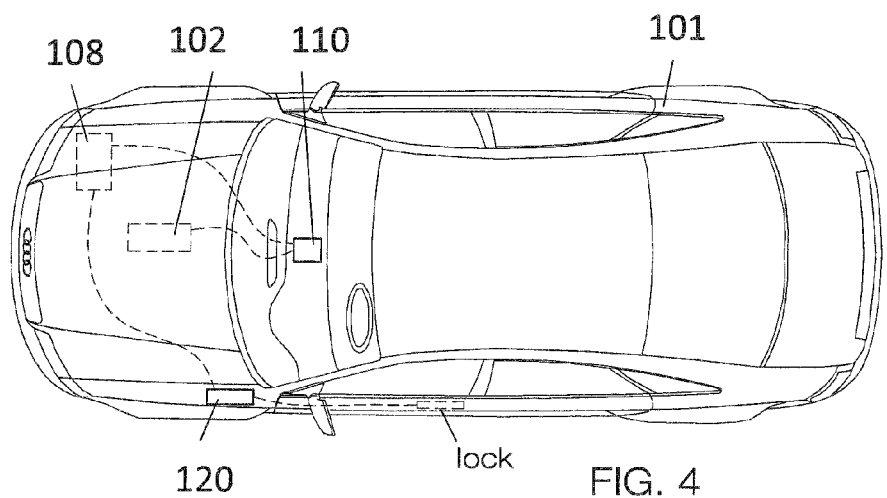
FIG. 4 is a top view of the system of the present invention.
Figure 5:
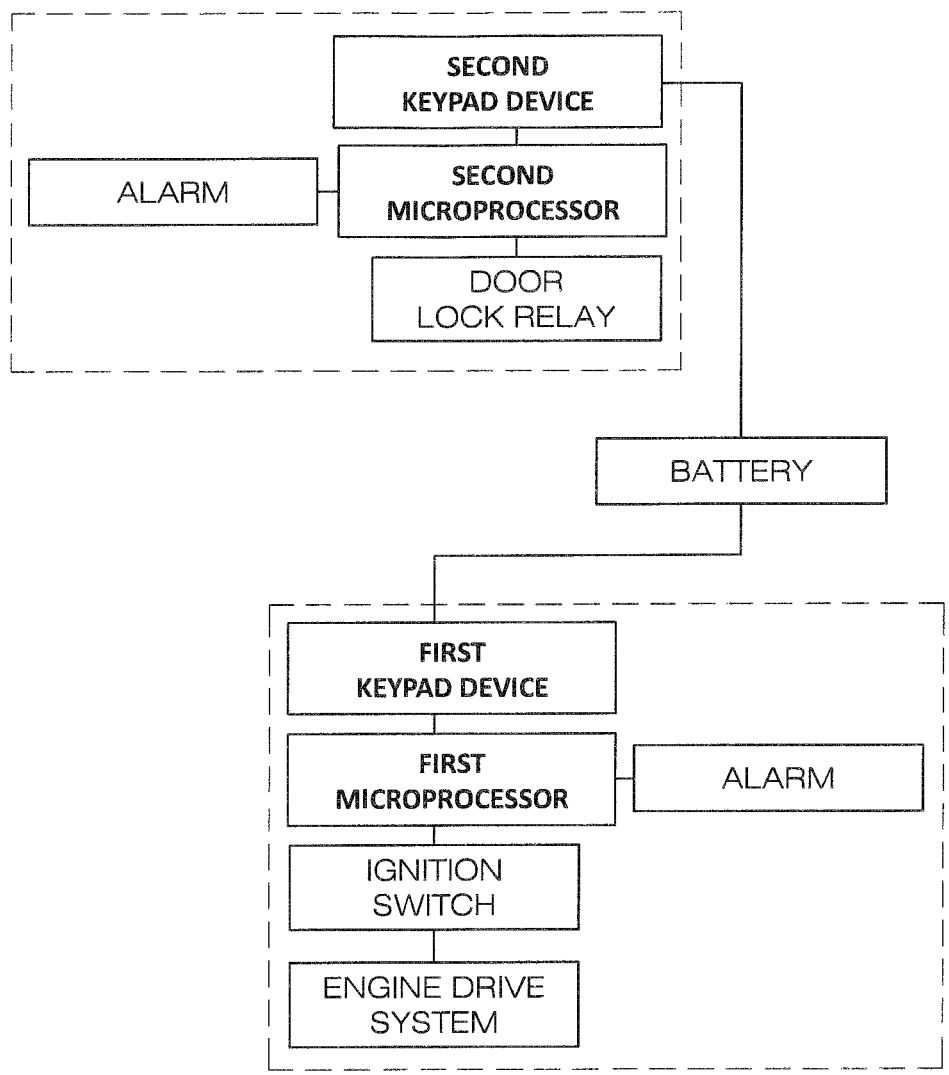
FIG. 5 is a first schematic representation of the electrical components of the system of the present invention.
Figure 6:
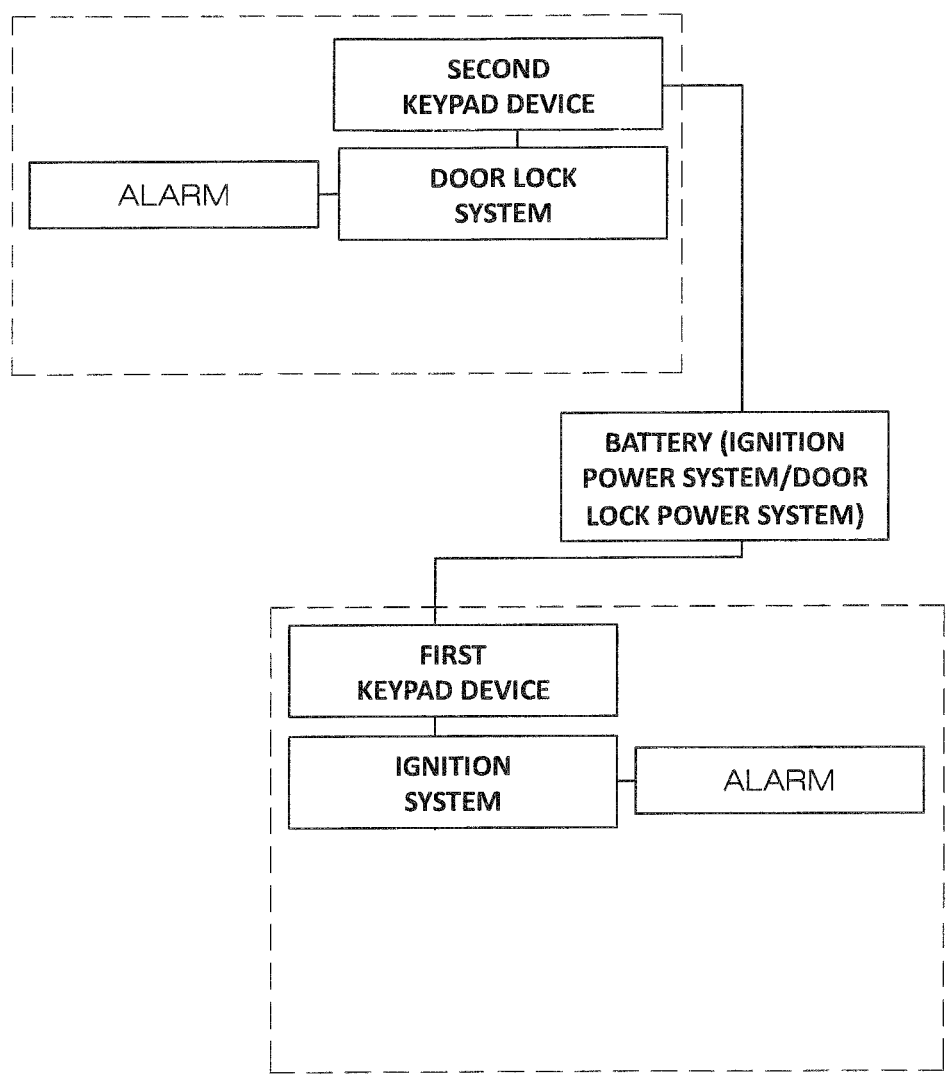
FIG. 6 is a second schematic representation of the electrical components of the system of the present invention.

Referring now to FIGS. 1-6, the present invention features an anti-theft system 100 for a vehicle 101. The system 100 of the present invention comprises a first keypad device 110 for locking and unlocking the ignition 102 of the vehicle. As shown in FIG. 1, the first keypad device 110 comprises a plurality of first keypad buttons (of numbers and/or letters), which a user uses to punch in his/her personal identification number (PIN), which is pre-programmed into the first keypad device 110.

The first keypad device 110 is operatively connected to the ignition system 102 (e.g., the ignition switch) of the vehicle 101. For example, the first keypad device 110 is installed in between the ignition system 102 and the ignition power system, which provides power to the ignition system 102. The first keypad device 110 generally operates in two states: an active state and an inactive state. In the active state, the predetermined code or PIN is pushed into the first keypad device 110, which causes the first keypad device 110 to operatively connect the ignition power system to the ignition system 102. In the inactive state, the PIN is not entered into the first keypad device 110 and the first keypad device 110 does not operatively connect the ignition power system to the ignition system 102. When the ignition system 102 lacks the operative connection to the ignition power system, the ignition system 102 is inactive.

In some embodiments, the movement of between the active state and the inactive state is mechanically controlled by the pressing of the first keypad buttons on the first keypad device 110, for example pressing the PIN physically moves components (e.g., wires) within the first keypad device 110, causing the connection of the ignition power system to the ignition system 102. In some embodiments, the first keypad device 110 comprises a first microprocessor operatively connected to the ignition system 102, ignition power system, and first keypad buttons, wherein the first microprocessor is configured to receive a first input signal from the first keypad buttons when the correct PIN is entered, causing the first microprocessor to send an output command to components that connect the ignitions system 102 to the ignition power system.

The system 100 of the present invention comprises a second keypad device 120 for locking and unlocking the doors of the vehicle. The second keypad device 120 comprises a plurality of second keypad buttons (of numbers and/or letters), which a user uses to punch in his/her personal identification number (PIN), which is pre-programmed into the second keypad device 120. The second keypad 120 may be mounted anywhere on the outside of the vehicle 101, not necessarily next to the doors.

The second keypad device 120 is operatively connected to the door lock system of the vehicle 101. For example, the second keypad device 120 is installed in between the door lock system and the door lock power system, which provides power to the door lock system. The second keypad device 120 generally operates in two states: an active state and an inactive state. In the active state, the predetermined code or PIN is pushed into second keypad device 120, which causes the second keypad device 120 to operatively connect the door lock power system to the door lock system. In the inactive state, the PIN is not entered into the second keypad device 120 and the second keypad device 120 does not operatively connect the door lock power system to the door lock system. When the door lock system lacks the operative connection to the door lock power system, the door lock system is inactive.

In some embodiments, the movement of between the active state and the inactive state is mechanically controlled by the pressing of the second keypad buttons on the second keypad device 120, for example pressing the PIN physically moves components (e.g., wires) within the second keypad device 120, causing the connection of the door lock power system to the door lock system. In some embodiments, the second keypad device 120 comprises a second microprocessor operatively connected to the door lock system, door lock power system, and second keypad buttons, wherein the second microprocessor is configured to receive a first input signal from the second keypad buttons when the correct PIN is entered, causing the second microprocessor to send an output command to components that connect the door lock system to the door lock power system.

In some embodiments, the first keypad device 110 further comprises a first alarm system (e.g., operatively connected to the first microprocessor), which is activated if the first keypad device 110 detects tampering. In some embodiments, the second keypad device 120 further comprises a second alarm system (e.g., operatively connected to the second microprocessor), which is activated if the second keypad device 120 detects tampering.

The first keypad device 110 and the second keypad device 120 may be operatively connected to the battery 108 of the vehicle 101.

The disclosures of the following U.S. patents are incorporated in their entirety by reference herein: U.S. Pat. No. 5,559,493; U.S. Pat. No. 4,852,680; U.S. Pat. No. 5,023,591; U.S. Pat. No. 5,422,632; U.S. Pat. No. 5,793,122; U.S. Pat. No. 5,045,837; U.S. Pat. No. 5,821,631; U.S. Pat. No. 5,006,843; U.S. Pat. No. 5,602,426.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An anti-theft system for a vehicle having an ignition system, an ignition power system, a door lock system and a door lock power system, said anti-theft system comprising:
  (a) a first keypad device for controlling an ignition system of the vehicle, the first keypad comprises a plurality of first keypad buttons and a first pre-programmed personal identification number (PIN), wherein the first keypad device is operatively connected to the ignition system and the ignition power system, the first keypad operates in (i) an active state when the pre-programmed PIN is entered into the first keypad device causing the first keypad device to operatively connect the ignition power system to the ignition system, and (ii) an inactivate state when the pre-programmed PIN is not entered into the first keypad device, the first keypad device does not operatively connect the ignition power system to the ignition system, wherein the ignition system is inactive when the ignition system is not operatively connected to the ignition power system; wherein the first keypad device is mounted inside the vehicle; wherein the first keypad device further comprises a first alarm system which is activated if the first keypad device detects tampering; and
  (b) a second keypad device for controlling a door lock system of the vehicle, the second keypad comprises a plurality of second keypad buttons and a second pre-programmed personal identification number (PIN), wherein the second keypad device is operatively connected to the door lock system and the door lock power system, the second keypad operates in (i) an active state when the pre-programmed PIN is entered into the second keypad device causing the second keypad device to operatively connect the door lock power system to the door lock system, and (ii) an inactivate state when the pre-programmed PIN is not entered into the second keypad device, the second keypad device does not operatively connect the door lock power system to the door lock system, wherein the door lock system is inactive when the door lock system is not operatively connected to the door lock power system, wherein the second keypad is mounted outside of the vehicle; wherein the second keypad device further comprises a second alarm system which is activated if the second keypad device detects tampering.

2. The anti-theft system of claim 1, wherein the first keypad device comprises a first microprocessor operatively connected to the ignition system, ignition power system, the first alarm system and first keypad buttons, wherein the first microprocessor is configured to receive a first input signal from the first keypad buttons when the pre-programmed PIN is entered, causing the first microprocessor to send a first output command to components to connect the ignitions system to the ignition power system.

3. An anti-theft system for a vehicle having an ignition system, an ignition power system, a door lock system and a door lock power system, said anti-theft system consisting of:
  (a) a first keypad device for controlling an ignition system of the vehicle, the first keypad consists of a plurality of first keypad buttons and a first pre-programmed personal identification number (PIN), wherein the first keypad device is operatively connected to the ignition system and the ignition power system, the first keypad operates in (i) an active state when the pre-programmed PIN is entered into the first keypad device causing the first keypad device to operatively connect the ignition power system to the ignition system, and (ii) an inactivate state when the pre-programmed is not entered into the first keypad device, the first keypad device does not operatively connect the ignition power system to the ignition system, wherein the ignition system is inactive when the ignition system is not operatively connected to the ignition power system; wherein the first keypad device is disposed inside the vehicle; wherein the first keypad device consists of a first alarm system which is activated if the first keypad device detects tampering; and
  (b) a second keypad device for controlling a door lock system of the vehicle, the second keypad consists of a plurality of second keypad buttons and a second pre-programmed personal identification number (PIN), wherein the second keypad device is operatively connected to the door lock system and the door lock power system, the second keypad operates in (i) an active state when the pre-programmed is entered into the second keypad device causing the second keypad device to operatively connect the door lock power system to the door lock system, and (ii) an inactivate state when the pre-programmed PIN is not entered into the second keypad device, the second keypad device does not operatively connect the door lock power system to the door lock system, wherein the door lock system is inactive when the door lock system is not operatively connected to the door lock power system, wherein the second keypad is mounted outside of the vehicle; wherein the second keypad device consists of a second alarm system which is activated if the second keypad device detects tampering.

* * * * *